(12) United States Patent
Rousseau et al.

(10) Patent No.: US 10,247,962 B2
(45) Date of Patent: Apr. 2, 2019

(54) METHOD OF CALCULATING AN OPTICAL SYSTEM OF A PROGRESSIVE ADDITION OPHTHALMIC LENS BEING ARRANGED TO OUTPUT A SUPPLEMENTARY IMAGE

(71) Applicant: Essilor International, Charenton le Pont (FR)

(72) Inventors: Benjamin Rousseau, Charenton le Pont (FR); Sébastien Fricker, Charenton le Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/302,097

(22) PCT Filed: Apr. 9, 2015

(86) PCT No.: PCT/EP2015/057723
§ 371 (c)(1),
(2) Date: Oct. 5, 2016

(87) PCT Pub. No.: WO2015/158601
PCT Pub. Date: Oct. 22, 2015

(65) Prior Publication Data
US 2017/0192250 A1   Jul. 6, 2017

(30) Foreign Application Priority Data
Apr. 14, 2014 (EP) ..................................... 14305545

(51) Int. Cl.
*G02C 7/02* (2006.01)
*G02C 7/08* (2006.01)
(Continued)

(52) U.S. Cl.
CPC ......... *G02C 7/027* (2013.01); *G02B 27/0172* (2013.01); *G02C 7/028* (2013.01);
(Continued)

(58) Field of Classification Search
CPC ........ G02C 7/027; G02C 7/028; G02C 7/063; G02C 7/068; G02C 7/0172; G02C 7/022;
(Continued)

(56) References Cited

U.S. PATENT DOCUMENTS 6,384,982 B1    5/2002  Spitzer
8,487,838 B2 *  7/2013  Lewis .................... A61B 3/113
                                              345/8
(Continued)

FOREIGN PATENT DOCUMENTS

WO    WO 2007/017766    2/2007

*Primary Examiner* — Kristina M Deherrera
(74) *Attorney, Agent, or Firm* — Oblon, McClelland, Maier & Neustadt, L.L.P.

(57) ABSTRACT

A progressive ophthalmic spectacle lens (10) capable of correcting a wearer's ophthalmic vision and having a back surface (BS) and a front surface (FS), said lens comprising a light guide optical element arranged to output a supplementary image (SI) to the wearer through an exit surface (ES) of said light guide optical element, where the exit surface (ES), the back surface (BS) and an optical material located between said exit surface (ES) and said back surface (BS) form an optical device (OD) and wherein said optical device (OD) comprises an area of stabilized optical power.

17 Claims, 1 Drawing Sheet

(51) Int. Cl.
*G02B 27/01* (2006.01)
*G02C 7/06* (2006.01)

(52) U.S. Cl.
CPC .............. *G02C 7/063* (2013.01); *G02C 7/068* (2013.01); *G02C 7/086* (2013.01); *G02B 2027/0178* (2013.01)

(58) Field of Classification Search
CPC .......... G02C 7/024; G02C 7/041; G02C 7/06; G02C 7/061; G02B 27/01; G02B 27/0101; G02B 27/0149; G02B 27/017; G02B 27/0172; G02B 27/0176; G02B 27/0179; G06T 19/006; H04N 13/044; H04N 5/7491
USPC .............. 351/159.42, 203–210, 158, 159.58, 351/159.74, 159.76, 246; 345/7–9, 345/632–633; 359/13–14, 618, 629–633; 348/113–120; 349/11
See application file for complete search history.

(56) References Cited

U.S. PATENT DOCUMENTS

| | | |
|---|---|---|
| 2010/0045927 A1 | 2/2010 | Moliton et al. |
| 2010/0171922 A1 | 7/2010 | Sessner et al. |
| 2012/0057122 A1 | 3/2012 | Guillot et al. |

\* cited by examiner

METHOD OF CALCULATING AN OPTICAL SYSTEM OF A PROGRESSIVE ADDITION OPHTHALMIC LENS BEING ARRANGED TO OUTPUT A SUPPLEMENTARY IMAGE

RELATED APPLICATIONS

This is a U.S. national stage application under 35 USC § 371 of International application No. PCT/EP2015/057723 filed on Apr. 9, 2015. This application claims the priority of European application no. 14305545.7 filed Apr. 14, 2014, the entire content of which is hereby incorporated by reference.

FIELD OF THE INVENTION

The invention relates generally to the field of progressive ophthalmic spectacle lenses. More specifically, it relates to a method of calculating an optical system of a progressive addition ophthalmic lens being arranged to output a supplementary image.

BACKGROUND OF THE INVENTION

A spectacle lens wearer can be prescribed a positive or a negative power correction. For presbyopic wearers, the value of the power correction varies as a function the viewing distance, due to difficulty in accommodation for near and/or intermediate vision. Far vision corresponds to viewing distances equal or greater to 400 cm, intermediate vision corresponds to viewing distances between 400 cm and 60 cm and near vision corresponds to viewing distances equal or less than 60 cm. A prescription for a given wearer thus comprises a prescribed power value for remote vision and a prescribed power addition representative of the power increment needed between remote vision and closer vision. The power addition is termed the "prescribed addition".

Ophthalmic lenses which compensate for presbyopia are commonly named "multifocal ophthalmic lenses", the most suitable being "progressive addition ophthalmic lenses". They comprise at least a remote vision zone (the farthest distance vision zone) and a closer vision zone (the nearest distance vision zone).

Progressive addition ophthalmic lenses are now well known. Such lenses are used to compensate for presbyopia and allow the spectacle wearer to see objects over a wide range of distances, without having to remove his or her glasses. Progressive addition lenses typically, but not limited to, have a remote vision region, located in the top of the lens, a closer vision region located in the bottom of the lens.

According to the wearer's needs, a progressive addition ophthalmic lens encompasses different embodiments such as followings:
- the remote vision is the far vision and the closer vision is the near vision;
- the remote vision is the intermediate vision and the closer vision is the near vision;
- the remote vision is the far vision and the closer vision is the intermediate vision.

One usually considers that a wearer is presbyopic when the prescribed addition is more than 0.5 Diopter, preferably equal or greater than 0.75 Diopter.

Accordingly a person skilled in the art would consider that an ophthalmic lens is a progressive addition ophthalmic lens only if the power variation observed on the lens is at least 0.5 Diopter, and preferably equal or greater than 0.75 Diopter.

Said general knowledge of a person skilled in the art is for example disclosed on page 96 of following book: «Les bases de la réfraction»; authors: Jean-Pierre Loyer and Thierry Chazalon; published in 1986; BB GR Editions.

Ophthalmic spectacle lenses providing an ophthalmic vision and a supplementary vision are known in the prior art. Said ophthalmic spectacle lenses have a front face and a back face and comprise a light-guide optical element. Said light-guide optical element is a device designed to transport light from a light source (for example light beam generator system) to the wearer's eye to enable information content to be viewed with minimal loss of information. According to an embodiment, light beams are reflected a plurality of times between two "reflection" faces between being introduced into the spectacle lens and exiting therefrom, said two reflection faces being faces of the light-guide optical element.

Document US 2012/057122 A1 discloses a method of calculating an optical system of a lens capable of correcting wearer's vision and comprising an embedded light guide optical element to output a supplementary image, but said document does not relate to progressive addition lenses.

SUMMARY OF THE INVENTION

One object of the present invention is to provide a progressive ophthalmic spectacle lens providing simultaneously both a suitable ophthalmic vision and a suitable supplementary vision. This and other objects are attained in accordance with one aspect of the invention directed to a method of calculating an optical system of a progressive addition ophthalmic lens capable of correcting wearer's vision and having a back surface and a front surface, arranged to deliver a corrected ophthalmic vision image to the wearer through the back surface, where the back surface is positioned closest to a wearer's eye when the progressive addition ophthalmic lens is worn, the progressive addition ophthalmic lens comprising an embedded light guide optical element having an exit surface and an opposite surface and being arranged to output a supplementary image to the wearer through the exit surface of said light guide optical element, wherein the method comprises the step of optimizing the optical system so that to provide an accommodation effort that is less than or equal to the wearer's residual accommodative effort when viewing from the corrected ophthalmic vision image to the supplementary image and vice versa.

Thanks to the method according to an embodiment of the present invention, a progressive ophthalmic lens optical system can be calculated that permits a wearer to comfortably see a scene and/or look to a supplementary image whatever the position of the light guide optical element within the lens. A progressive ophthalmic lens corresponding to said progressive ophthalmic lens optical system can further be manufactured.

The said method of calculating an optical system of a progressive addition ophthalmic lens capable of correcting wearer's vision wearer is directed to correcting the vision of a presbyopic wearer; accordingly, the prescribed addition of said wearer is more than 0.5 Diopter, preferably equal or greater than 0.75 Diopter.

In the context of the present invention, the expression "ophthalmic vision" means the visible perception of a scene such that this scene appears to him in front of him. Image of the scene originates directly from the wearer's environment when viewing said scene. The global information which is contained in the scene are thus perceived even though the image of the scene is deformed to provide a corrected image according to wearer's prescription.

Unlike the ophthalmic vision, a supplementary vision may provide the subject with information that does not originate directly from his environment. It may be data presented to the subject. For example, navigation data which are projected overlaid on the visor of an airplane pilot's headset constitute a supplementary vision, of the informative vision type. A supplementary vision of another type may supply modified images of certain parts of the subject's environment. Thus, other examples of supplementary vision are the provision of an infrared image which is converted into visible light, or an image of a part of the subject's environment which is enlarged.

A spectacle lens to which the invention is applied is designed to present such supplementary images in the field of vision of the wearer, or in a part of this field, while retaining the ophthalmic vision. In other words, the two visions, ophthalmic and supplementary, are available to the wearer. They may be available simultaneously or alternately. In the case of an informative supplementary vision, the supplementary image corresponds to the visual presentation of information data. These data may appear overlaid on the ophthalmic image, notably with a light intensity which is greater or with a color which is distinct. The ophthalmic image may remain visible or not while the data of the informative supplementary vision are presented to the wearer.

In the framework of the invention, the following terms have the meanings indicated herein below:
- an "optical system (OS)" of a progressive addition ophthalmic lens comprising an embedded light guide optical element is a set of data and/or equations defining the back surface (BS) and the front surface (FS) of said lens, the exit surface (ES) and the opposite surface (OPS) of said light guide optical element, the relative position of the said different surfaces and the refractive indexes between the different surfaces; the light guide optical element is called "embedded" when it is positioned between the back surface (BS) and front surface (FS) of the lens;
- a "progressive addition" lens is a lens with a surface which is not rotationally symmetrical, with continuous change of focal power over a part or the whole of the lens; as here above mentioned and according to the general knowledge of a person skilled in the art, the power variation observed on the lens is at least 0.5 Diopter, and preferably equal or greater than 0.75 Diopter;
- "prescription data" are a set of optical characteristics of optical power, of astigmatism and, where relevant, of addition, determined by an ophthalmologist or an eye care practitioner (ECP) in order to correct the vision defects of an individual, for example by means of a lens positioned in front of his eye. The term 'astigmatism' is used to denote the data pair formed by an amplitude value and a value of angle. Although this is an abuse of language, it is also sometimes used to denote the amplitude of the astigmatism only. The context allows those skilled in the art to understand which usage of the term is intended. Generally speaking, the prescription data for a progressive lens comprise values of optical power and of astigmatism at the distance-vision point and the dioptric add power, also called the addition value;
- "surface characteristics" of a lens are geometrical data relating to one face of the lens, such as values of average sphere or of cylinder, for example;
- "average sphere", denoted D is (N−1) times the half-sum of the inverses of the two radii of curvature of a surface expressed in meter, denoted R1 and R2, and determined at the same point on the latter. In other words:

$$D=(N-1)\cdot(1/R1+1/R2)/2,$$

where N is the index of refraction of the lens,
R1 is the minimum radius of curvature,
R2 is the maximum radius of curvature;
cylinder, denoted C is (N−1) times the absolute value of the difference of the inverses of the two radii of curvature of a surface expressed in meter, determined at the same point on the latter. In other words:

$$C=(N-1)\cdot|1/R1-1/R2|;$$

- a "progressive addition surface" is meant a continuous, aspheric surface having at least two distance vision zones and a zone connecting said two distance vision zones, where the dioptric power in the connecting zone increases between the farthest distance vision zone and the nearest distance vision zone;
- a "regressive surface" is meant a continuous, aspheric surface having at least two distance vision zones and a zone connecting said two distance vision zones, where the dioptric power in the connecting zone decreases between the farthest distance vision zone and the nearest distance vision zone;
- a "distance vision zone" is meant a zone of the multifocal lens where the viewer has a comfortable vision for a given distance; distance vision zones are usually chosen within the list consisting of far vision zone (far viewing distance, namely viewing distance of more than four meters), intermediate vision zone (medium distance such as computer viewing distance, namely viewing distance of about 60 cm to four meters), near vision zone (reading distance, namely viewing distance of less than 60 cm);
- a "dioptric add power" is meant the amount of dioptric power difference between two distance vision zones where said difference is calculated between the dioptric power of the nearest distance vision zone and the dioptric power of the farthest distance vision zone;
- "design" and "design optical data" are widely used wordings known from the man skilled in the art that refer to the set of parameters allowing to define an optical function of a generic optical system. As for an example, a PAL "design" results of an optimization of the progressive surface so as to restore a presbyope's ability to see clearly at all distances but also to optimally respect all physiological visual functions such as foveal vision, extra-foveal vision, binocular vision and to minimize unwanted astigmatisms;
- an "optical target" (OT) is a virtual optical function that represents the optical powers and optical aberrations distribution as a function of the gaze direction; it includes mean power distribution and resulting astigmatism distribution;
- "height" is used to define a lens or a lens zone dimension corresponding to a vertical when the sight is horizontal;
- "width" is used to define a lens or a lens zone dimension corresponding to a horizontal when the sight is horizontal.

The residual accommodation effort of a wearer is a data, or a set of data, directed of the amount of accommodation that the wearer can use without generating visual fatigue. This residual accommodation effort varies between people. It is therefore advantageous to measure the residual accommodation effort of a given wearer in order to adapt the lens. In particular for a wearer with small residual accommodation effort, it may be advantageous to choose a lens with a low front radius sphere, which should reduce the required accommodation effort. On the contrary for a wearer with a large residual accommodation effort, it may be advantageous to choose a lens with a higher front radius sphere, which should reduce residual aberrations. Using a pre-determined residual accommodation value for all wearers may result in lenses that could generate visual fatigue or not be optimum in terms of aberrations.

The residual accommodation effort of a wearer is a data that can be determined by an ophthalmologist or an eye care practitioner (ECP) according to methods known from a person skilled in the art; according to an embodiment, it is measured thanks to a skiaskopic method; it can also be determined according to a "push up" method or a Sheard method.

According to the "push up" method (also called Donders or Duane method) a line is brought toward the wearer until the legible print blurs. This point, the punctum proximum is converted into its dioptric equivalent.

According to the Sheard method, a print is held at a constant near point, such as 40 cm, while minus power is added before the eyes until the print blurs. The amount of added minus represents the amplitude of accommodation.

Bibliographical references for residual accommodation effort measurement methods can be found for example in following books: "*Borish's Clinical Refraction*", author: William J. Benjamin; Butterworth Heinemann Elsevier Edition; and, "*Clinical Management of Binocular Vision*"; authors: Mitchell Scheiman and Bruce Wick; Wolters Kluwer Editions. The residual accommodation effort of a wearer can also been determined according to data that are determined for a "standard" wearer; said data are usually presented as a function of the age of the standard wearer.

When measuring or evaluating the residual accommodation effort of a wearer, one cans determinate following parameters:
$P_{prox}$ which is the proximity of the Punctum proximum value expressed in diopter;
$P_{rem}$ which is the proximity of the Punctum remotum value expressed in diopter;
$P_{conf}$ which is the proximity of the Punctum comfort value expressed in diopter, corresponding to a reduced accommodation effort for the wearer which is compatible with extended use of the system.

The residual accommodation effort of a wearer can also be evaluated on the basis of already established residual accommodation effort data sets depending for example on the wearer's age.

According to different embodiments of the present invention, that may be combined according to all technically valuable embodiments:
the progressive addition ophthalmic lens is chosen within the list consisting of a lens comprising a far vision zone, an intermediate vision zone and a near vision zone; a lens comprising an intermediate vision zone and a near vision zone; a lens comprising a far vision zone and an intermediate vision zone;
the exit surface (ES) is defined by an angular aperture contour, denoted $AC(\alpha,\beta)$, $\alpha$ being the eye declination angle and $\beta$ being the eye azimuth angle, comprising the successive steps of:
providing prescription data of the wearer;
providing an optical target (OT) that has a virtual optical function according to the wearer's prescription data where the optical power of said optical target is denoted $P_{OT}(\alpha,\beta)$;
calculating the average sphere value $D_{FS}(\alpha,\beta)$, of the front surface (FS), so that it fulfils the requirement of following equation (E1), when $(\alpha,\beta)$ is within the contour $AC(\alpha,\beta)$:

$$P_{OT}(\alpha,\beta) - \frac{1}{-\frac{1}{P_{rem}}} \leq D_{FS}(\alpha,\beta) \leq P_{OT}(\alpha,\beta) - \frac{1}{ELD - \frac{1}{P_{prox}}} \quad (E1)$$

wherein:
$P_{prox}$ is the proximity of the Punctum proximum value expressed in diopter;
$P_{rem}$ is the proximity of the Punctum remotum value expressed in diopter;
ELD is chosen within the list consisting of the measured wearer's eye-lens distance expressed in meter; the standard wearer's eye-lens distance expressed in meter; ELD=0;
according to preceding embodiment, the proximity of the Punctum proximum value, $P_{prox}$, and the proximity of the Punctum remotum value, $P_{rem}$, are chosen within a list consisting of constant data of a model eye; data of a model eye varying as a function of the age of the wearer; data of a model eye varying as a function of the prescription of the wearer; data of a model eye varying as a function of the age and the prescription of the wearer; measured data done with the actual wearer's eye;
"$P_{prox}$" is replaced by "$P_{conf}$" equation E1 where $P_{conf}$ is the Punctum comfort value expressed in diopter, corresponding to a reduced accommodation effort for the wearer which is compatible with extended use of the system;
the method comprises a further step, when $D_{FS}(\alpha,\beta)$ values obtained within the contour $AC(\alpha,\beta)$ corresponds to a sphero-toric surface, of using this spherotoric surface over the front surface (FS) when $(\alpha,\beta)$ is out of the contour $AC(\alpha,\beta)$, then optimizing the back surface according to the chosen design data as a target;
the method comprises a further step of selecting a front surface (FS) within a plurality of front surface base-curves where the chosen front surface base-curve is the one which approaches the best the requirements of equation (E1), when $(\alpha,\beta)$ is within the contour $AC(\alpha,\beta)$;
the method comprises further steps of:
providing a set of data and/or equations defining the exit surface $(ES(R,\alpha,\beta))$ and the opposite surface $(OPS(R,\alpha,\beta))$ of the light guide optical element according to $(R,\alpha,\beta)$ coordinates, where R is the distance of a point when considering the Center of Rotation of the Eye (CRE) as the originate;
providing the refractive indexes between the different surfaces within the list consisting of the back surface (BS), the front surface (FS) of the progressive addition ophthalmic lens, the exit surface (ES), the opposite surface (OPS) of the light guide optical element;
providing a desired direction for the supplementary image delivered by the light-guide optical element;

optimizing the back surface (BS) according to the requirements of the wearer's prescription data and the desired direction for the supplementary image as targets;

the method comprises further steps of:

providing a set of data and/or equations defining the exit surface (ES(R,α,β)) and the opposite surface (OPS(R,α,β)) of the light guide optical element according to (R,α,β) coordinates, where R is the distance of a point when considering the Center of Rotation of the Eye (CRE) as the originate;

providing the refractive indexes between the different surfaces within the list consisting of the back surface (BS), the front surface (FS) of the progressive addition ophthalmic lens, the exit surface (ES), the opposite surface (OPS) of the light guide optical element;

optimizing simultaneously the average sphere value $D_{BS}(\alpha,\beta)$ over the back surface (BS) and the front surface (FS) according to the optical target (OT), to the requirements of equation E1 and to wearer's prescription data as targets.

Spectacle lenses are manufactured on request in accordance with specifications intrinsic to individual wearers. However lenses are commonly manufactured by using a limited number of semi-finished lens blanks. A semi-finished lens blank has a front face and a rear face.

In the frame of the present invention the average sphere of the front face measured at the prescription point is called a "base-curve". Depending on the type of lens, the prescription point can be the far vision reference point or the near vision reference point.

The base-curves are usually expressed referring to a standard refractive index of 1.53, whereas other refractive indexes may also be used to refer and express base-curves.

The front face of a semi-finished lens blank is intended to be the final front surface of the final lens and the other face is machined so as the optical system of the final lens fits the wearer ophthalmic prescriptions. Some minor machining of the front face may occur, but without modifying its curvature.

Semi-finished lens blanks are usually obtained by injection moulding or by casting into moulds. They also can be produced by machining a blank.

Manufacturers typically produce a series of semi-finished lens blanks, each having its own base curve. This "base-curve series" is a system of semi-finished lens blanks that front faces increase incrementally in curvature (e.g., +0.50 D, +2.00 D, +4.00 D, and so on).

The front surface of a semi-finished lens blank of a base-curve series serves as the starting point from which the optical surface of the back surface will be calculated and the final lens be manufactured according to a wearer prescription (or focal power). The front surfaces of the semi-finished lens blanks of a "base-curve series" may be spheres, aspheric surfaces, progressive or regressive addition surfaces. Each base-curve in a series is conventionally used for producing a range of prescriptions, as specified by the manufacturer. Manufacturers use base-curve selection charts that provide the recommended prescription ranges for each base-curve in the series.

A standard base-curve series comprises less or equal to twenty base-curves, as for example less or equal to ten, and preferably five to eight base-curves.

The calculation step can be performed by using a ray-tracing method or optimization algorithms. These methods are known by the one skilled in the art, for example in the publication "Application of optimization in computer-aided ophthalmic lens design" (P. Allione, F. Ahsbahs and G. Le Saux, in SPIE Vol. 3737, EUROPTO Conference on Design and Engineering of Optical Systems, Berlin, May 1999), which is incorporated by reference in the present document.

Calculating the optical system of a lens with a given front face is also known from the man skilled in the art and an example of an accurate method is disclosed in patent document WO 2007/017766. The present invention is also directed to a method for manufacturing a progressive addition ophthalmic lens by machining a lens blank according to the optical system (OS) of any of preceding embodiments according to the present invention.

Another aspect of the present invention is directed to a computer program product comprising one or more stored sequence of instruction that is accessible to a processor and which, when executed by the processor, causes the processor to carry out at least the steps of any of the here above recited method of calculating an optical system.

Another aspect of the present invention is directed to a computer readable medium carrying one or more sequences of instructions of preceding the computer program product.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

Another aspect of the present invention is directed to a progressive addition ophthalmic lens capable of correcting wearer's vision and having a back surface (BS) and a front surface (FS), arranged to deliver a corrected ophthalmic vision image (CVI) to the wearer through the back surface (BS), where said back surface is positioned closest to a wearer's eye when the progressive addition ophthalmic lens is worn, the progressive addition ophthalmic lens comprising a light guide optical element arranged to output a supplementary image (SI) to the wearer through an exit surface (ES) of said light guide optical element, wherein the progressive addition ophthalmic lens is arranged so as to enable the wearer of said lens to provide an accommodation effort that is less than or equal to the wearer's residual accommodative effort when viewing from the corrected ophthalmic vision image (CVI) to the supplementary image (SI) and vice versa.

According to an embodiment of said progressive addition ophthalmic lens:
- the progressive addition lens is chosen within the list consisting of a lens comprising a far vision zone, an intermediate vision zone and a near vision zone; a lens comprising an intermediate vision zone and a near vision zone; a lens comprising a far vision zone and an intermediate vision zone;
- the supplementary image (SI) is output in at least a zone of the intermediate vision zone and/or of the near vision zone;
- the mean sphere of the front surface (FS) is at least 2 Diopter.

According to another embodiment of said progressive addition ophthalmic lens:
- the progressive addition lens is chosen within the list consisting of a lens comprising a far vision zone, an intermediate vision zone and a near vision zone; a lens comprising a far vision zone and an intermediate vision zone;
- the supplementary image (SI) is output in at least a zone of the far vision zone;
- the mean sphere of the front surface (FS) is equal to or less than 2 Diopter.

BRIEF DESCRIPTION OF THE DRAWINGS

Examples will now be described with reference to the accompanying drawings wherein.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF THE DRAWINGS

Figure 1A:
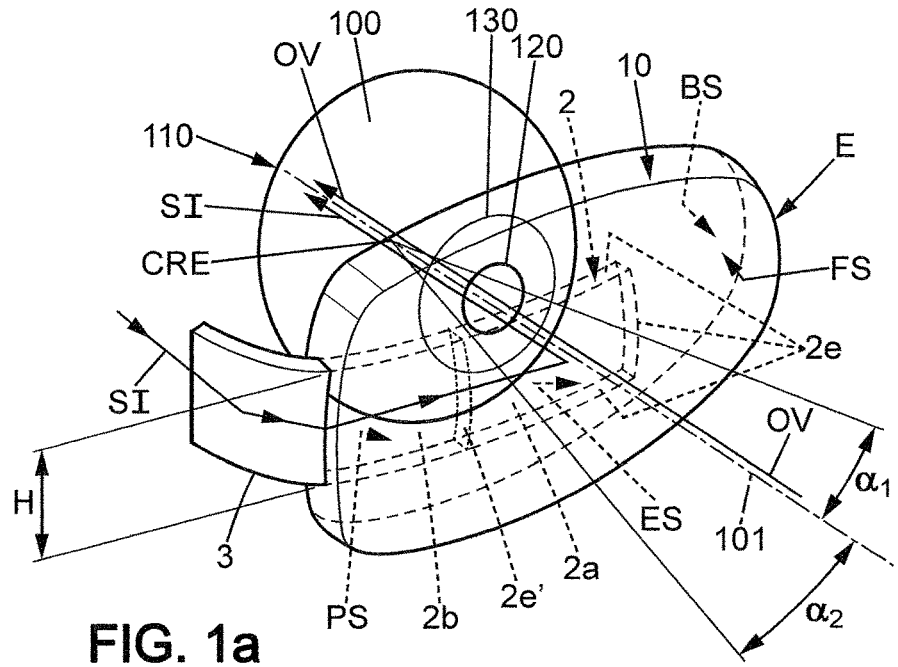
FIGS. 1a and 1b are sketches of an eye of a wearer and of an ophthalmic spectacle lens capable of correcting the wearer's ophthalmic vision and comprising a light guide optical element arranged to output a supplementary image.
Figure 1B:
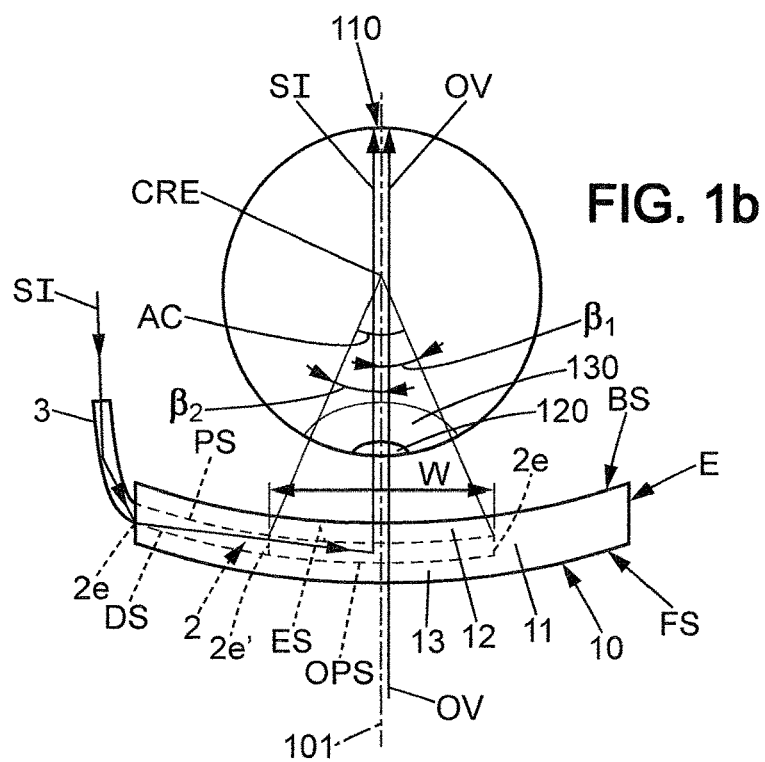

FIGS. 1a and 1b are sketches that illustrate the principle of a spectacle lens 10 which provides both an ophthalmic vision OV and a supplementary vision by outputting a supplementary image SI to an eye 100 of a wearer. The spectacle lens is capable of correcting a wearer's ophthalmic vision; it has a back surface BS and a front surface FS where the back surface is positioned closest to the wearer's eye when the spectacle lens is worn; said spectacle lens also comprises a light guide optical element 2 arranged to output a supplementary image SI to the wearer through an exit surface ES of said light guide optical element.

The lens 10 consists of at least two transparent and refringent materials, which may be any organic or mineral material used in the ophthalmic field. The light guide optical element 2 is inserted between the back surface BS and the front surface FS. The light guide optical element 2 has two opposite faces named "proximal surface" PS and "distal surface" DS where the proximal surface is closer to the eye of the wearer than the distal surface when the spectacle lens is worn. Accordingly the proximal surface PS is the surface of the light guide optical element which is the closest from the back surface BS and the distal surface DS the surface of the light guide optical element which is the closest from the front surface FS.

According to the embodiment of FIGS. 1a & 1b, the proximal surface PS and the distal surface DS are parallel surfaces;

According to another embodiment, the proximal surface PS and the distal surface DS are non-parallel surfaces;

According to the embodiment of FIGS. 1a & 1b, the proximal surface PS and/or the distal surface DS is a (are) plane surface(s);

According to another embodiment, the proximal surface PS and/or the distal surface DS is a (are) curved surface(s); such a curved surface is for example a spherical surface, a toric surface, a sphero-toric surface; such a curved surface can also be an aspherized spherical or toric or sphero-toric surface.

A first transparent and refringent material is situated around the light guide optical element 2; the light guide optical element 2 is made of a second transparent and refringent material; the refractive indexes of said two materials may be identical, slightly different or significantly different.

According to the present embodiment, the lens 10 has a convex front surface FS and a concave back surface BS. The surfaces FS and BS have respective curvatures which together determine, with the value(s) of light refractive index(es) of the material(s) between said two surfaces, an optical power of the spectacle lens, for the ophthalmic vision OV.

In the frame of the present invention, this optical power varies between the directions of sight so as to provide a multifocal vision.

The light guide optical element 2 is appropriate for bringing supplementary light from a source 3 which is not represented in detail so as to produce a supplementary image SI. The structure of the light guide optical element 2 is not the subject of this description, and reference can be made to other documents available on this subject. One example of a suitable light optical element is described in patent document WO2005024491 or in patent document WO200195027 in the name of the LUMUS Company. Generally, this invention can apply to any light optical element embedded in the lens providing supplementary image, for which the supplementary image may be distorted or modified by the optical properties of the back surface BS of the lens.

The lens 10 has a front portion 13 which is between the light guide optical element 2 and the front surface FS, and a rear portion 12 which is between the light guide optical element 2 and the back surface BS.

The light guide optical element 2 is limited transversely within an area of the lens 10 in certain directions approximately parallel to the faces FS and BS. In such a configuration, the front portion 13 and the rear portion 12 of the lens 10 extend beyond a peripheral edge 2e of the light guide optical element 2. The lens 10 then has an intermediate portion 11 which extends beyond the edge 2e of the light guide optical element 2 and which continually links the portions 13 and 12 to a peripheral edge E of the lens 10.

The light guide optical element 2 is virtually divided in two zones 2a and 2b separated by a virtual edge 2e'. Zone 2a is the imaging part wherefrom does the supplementary image come from according to the eye of the wearer; zone 2b is a propagation part wherein the supplementary image is propagated from the source 3 without supplying an image to the wearer.

The edge of zone 2a is the contour of the supplementary image output by the light guide optical element; said supplementary image intercepts the proximal surface PS according to an exit surface ES. One names "opposite surface" OS the surface corresponding to the exit surface ES on the distal surface. According to the present example the imaging part is substantially a rectangle whose width is W and whose height is H.

According to a commonly used optical referential, the exit surface ES is defined by an angular aperture contour, denoted $AC(\alpha,\beta)$, $\alpha$ being the eye declination angle and $\beta$ being the eye azimuth angle. $\alpha$, $\beta$ pole is the center of rotation, CRE, of the eye 100 of the wearer behind the lens. 101 corresponds to the axis where $\alpha=\beta=0$.

According to an example, the aperture AC may be +/−15° (degree) either side of an optical axis of the supplementary vision, which passes through the center of the exit surface ES. Said aperture is defined in the azimuthal plane by $|\beta_1|+|\beta_2|$. It is defined in the perpendicular plane by $|\alpha_1|+|\alpha_2|$. The generatrix lines of the limit of the angular aperture contour intersect the back surface BS of the lens in an area in which the two visions, ophthalmic and supplementary, are superposed. In the configuration of FIGS. 1a and 1b, the respective optical axes of the ophthalmic vision and of the supplementary vision are one and the same, but they may be distinct.

FIGS. 1a and 1b represent the spectacle lens in the position of use by the wearer. The eye of the wearer 100 is therefore situated behind the lens 10 on the side of the back surface so that it receives, on the one hand, light OV originating from the environment which is situated in front of the lens, and, on the other hand, the light corresponding to the supplementary image SI which is brought by the light guide optical element 2. The light beams of the two lights OV and SI correspond respectively to the ophthalmic vision and to a supplementary vision. They respectively form, after having passed through the pupil 120, an ophthalmic image and a supplementary image on the retina 110 of the wearer. The reference 130 designates the iris of the wearer which surrounds his pupil 120. The direction in which the wearer is looking corresponds to the optical axis of the eye 100. It intersects the surfaces FS and BS of the spectacle lens at respective points which vary when the eye 100 turns in the orbit of the wearer.

Given that the light OV passes through the two surfaces FS and BS of the lens, they both contribute to optical characteristics of the lens which are relative to the ophthalmic vision. However, the light SI does not pass through the surface FS, so that this surface does not contribute to optical characteristics of the lens which are relative to the supplementary vision. Because of this difference between the lights OV and SI, they do not present convergence characteristics which are identical after they have passed through the back surface BS of the lens. For this reason, the ophthalmic and additional images which are formed on the retina may not be simultaneously clear.

The expression "optical characteristics of lens which are relative to one or other of the ophthalmic and supplementary visions" should be understood notably to mean an optical power value, astigmatism values, optical distortion values, etc., of the lens for each direction in which the wearer looks.

Following examples are given to illustrate embodiments where an ophthalmic spectacle lens capable of correcting the wearer's ophthalmic vision and comprising a light guide optical element arranged to output a supplementary image according to FIGS. 1a and 1b is designed to fulfill the requirements of the present invention.

According to said embodiments the proximal surface PS and the distal surface DS are parallel and plane surfaces. According to other possible embodiments, the proximal surface PS and the distal surface DS are non-parallel and/or curved surfaces.

According to an example, the residual accommodation effort of a wearer is determined by an ophthalmologist or an eye care practitioner (ECP); according to said embodiment, the ophthalmologist or eye care practitioner (ECP) simultaneously measures the proximity of the Punctum proximum value, the proximity of the Punctum remotum value expressed in diopter and the Punctum comfort value.

Thanks to those measurements, one can determinate the data that can be used to fulfill the requirements of Equation (E1) for a given wearer, and thus determine the range of average sphere value $D_{FS}(\alpha,\beta)$ of the front surface (FS), when $(\alpha,\beta)$ is within the contour $AC(\alpha,\beta)$, that provides an accommodation effort that is less than or equal to the wearer's residual accommodative effort when viewing from the corrected ophthalmic vision image (CVI) to the supplementary image (SI) and vice versa.

According to another example, the residual accommodation effort of a wearer is determined according to data that are determined for a "standard" wearer as a function of the age (in years) of the standard wearer and as a function of prescription of said wearer.

Tables 1 and 2 show examples $P_{rem}$, $P_{prox}$, $P_{conf}$ (expressed in diopter), where table 1 corresponds to an emmetropic wearer (no correction is needed) and table 2 to a myopic wearer needing a 2 diopters correction;

TABLE 1

| | Age | | | | |
|---|---|---|---|---|---|
| | 40 | 45 | 50 | 55 | 60 |
| $P_{rem}$ | 0 | 0 | 0 | 0 | 0 |
| $P_{conf}$ | 3 | 2 | 0.5 | 0.3 | 0.25 |
| $P_{prox}$ | 5 | 3 | 1.5 | 1.2 | 1 |

TABLE 2

| | Age | | | | |
|---|---|---|---|---|---|
| | 40 | 45 | 50 | 55 | 60 |
| $P_{rem}$ | 2 | 2 | 2 | 2 | 2 |
| $P_{conf}$ | 5 | 4 | 2.5 | 2.3 | 2.25 |
| $P_{prox}$ | 7 | 5 | 3.5 | 3.2 | 3 |

Thanks to those tables, one can determinate the data that can be used to fulfill the requirements of Equation (E1) for a given wearer, and thus determine the range of average sphere value $D_{FS}(\alpha,\beta)$ of the front surface (FS), when $(\alpha,\beta)$ is within the contour $AC(\alpha,\beta)$, that provides an accommodation effort that is less than or equal to the wearer's residual accommodative effort when viewing from the corrected ophthalmic vision image (CVI) to the supplementary image (SI) and vice versa.

Based on the range of average sphere value $D_{FS}(\alpha,\beta)$ when $(\alpha,\beta)$ is within the contour $AC(\alpha,\beta)$, one can provide the front surface (FS) of the lens.

For example, one can select a semi-finished lens among a set of semi-finished lens having front surface (FS) geometry complying with the range of average sphere value $D_{FS}(\alpha,\beta)$.

As an alternative, it is also possible to calculate a new front surface (FS) complying the range of average sphere value $D_{FS}(\alpha,\beta)$.

The semi-finished or new calculated front surface (FS) can be a progressive surface, a regressive surface, a spherical surface, and the curvature may be no constant on the surface.

Among all front surface (FS) complying with the range of average sphere value $D_{FS}(\alpha,\beta)$, one can select a front surface (FS) having the preferred geometry, for example the geometry that best fits with the geometry of the frame.

Once the front surface (FS) is selected or calculated, it is then possible to build the whole back surface taking into account the prescription data of the wearer.

One can for example make an optimization of said back surface according to a desired design optical data.

One can also choose a preferred gaze direction to make an optimization of said back surface.

Once the back surface is calculated, one can calculate the optical system (OS) of a progressive addition ophthalmic lens capable of correcting wearer's vision and having a back surface (BS) and a front surface (FS), arranged to deliver a corrected ophthalmic vision image (CVI) and to output a supplementary image (SI).

The optical system (OS) of the calculated progressive addition ophthalmic lens (and a lens manufactured accordingly) provides an accommodation effort that is less than or equal to the wearer's residual accommodative effort when viewing from the corrected ophthalmic vision image (CVI) to the supplementary image (SI) and vice versa.

The invention has been described above with the aid of embodiments without limitation of the general inventive concept; in particular the parameters are not limited to the examples discussed.

The invention claimed is:

1. A method of calculating and manufacturing an optical system of a progressive addition ophthalmic lens having a power variation observed thereon of at least 0.5 Diopter, the progressive addition ophthalmic lens being capable of correcting wearer's vision and having a back surface and a front surface, arranged to deliver a corrected ophthalmic vision image to the wearer through the back surface, where the back surface is positioned closest to a wearer's eye when the progressive addition ophthalmic lens is worn, the progressive addition ophthalmic lens comprising an embedded light guide optical element having an exit surface and an opposite surface and being arranged to output a supplementary image to the wearer through the exit surface of said light guide optical element, the method comprising:
a calculation step including calculating the optical system by optimizing the back surface of the optical system to provide an accommodation effort that is less than or equal to the wearer's residual accommodative effort when viewing from the corrected ophthalmic vision image to the supplementary image and vice versa; and
a manufacturing step including machining a lens blank according to the optical system calculated in the calculation step,
wherein the progressive addition ophthalmic lens is chosen from within a list consisting of: a lens having a far vision zone, an intermediate vision zone and a near vision zone, a lens having an intermediate vision zone and a near vision zone, a lens having a far vision zone and an intermediate vision zone.

2. The method of calculating and manufacturing an optical system as claimed in claim 1, wherein the progressive addition ophthalmic lens has a power variation observed thereon of at least 0.75 Diopter.

3. A non-transitory computer readable medium comprising one or more stored sequence of instruction that is accessible to a processor and which, when executed by the processor, causes the processor to carry out at least the steps of claim 1.

4. The method of calculating and manufacturing an optical system as claimed in claim 1, wherein the exit surface is defined by an angular aperture contour, denoted $AC(\alpha,\beta)$, $\alpha$ being the eye declination angle and $\beta$ being the eye azimuth angle, further comprising the successive steps of:
providing prescription data of the wearer;
providing an optical target that has a virtual optical function according to the wearer's prescription data where the optical power of said optical target is denoted $P_{OT}(\alpha,\beta)$; and
calculating the average sphere value $D_{FS}(\alpha,\beta)$, of the front surface, so that it fulfils the requirement of following equation (E1), when $(\alpha,\beta)$ is within the contour AC $(\alpha,\beta)$:

$$P_{OT}(\alpha, \beta) - \frac{1}{-\frac{1}{P_{rem}}} \leq D_{FS}(\alpha, \beta) \leq P_{OT}(\alpha, \beta) - \frac{1}{ELD - \frac{1}{P_{prox}}} \quad (E1)$$

wherein:
$P_{prox}$ is the proximity of the Punctum proximum value expressed in diopter;
$P_{rem}$ is the proximity of the Punctum remotum value expressed in diopter;
ELD is chosen within the list consisting of the measured wearer's eye-lens distance expressed in meter; the standard wearer's eye-lens distance expressed in meter; ELD=0.

5. The method of calculating and manufacturing an optical system as claimed in claim 4, wherein the proximity of the Punctum proximum value, $P_{prox}$, and the proximity of the Punctum remotum value, $P_{rem}$, are chosen within a list consisting of: constant data of a model eye; data of a model eye varying as a function of the age of the wearer; data of a model eye varying as a function of the prescription of the wearer; data of a model eye varying as a function of the age and the prescription of the wearer; measured data done with the actual wearer's eye.

6. The method of calculating and manufacturing an optical system as claimed in claim 5, wherein the method comprises further steps of:
providing a set of data and/or equations defining the exit surface $(ES(R,\alpha,\beta))$ and the opposite surface $(OPS(R,\alpha,\beta))$ of the light guide optical element according to $(R,\alpha,\beta)$ coordinates, where R is the distance of a point when considering the Center of Rotation of the Eye as the originate;
providing the refractive indexes between the different surfaces within the list consisting of the back surface, the front surface of the progressive addition ophthalmic lens, the exit surface, the opposite surface of the light guide optical element; and
optimizing simultaneously the average sphere value $D_{BS}(\alpha,\beta)$ over the back surface and the front surface according to the optical target, to the requirements of equation E1 and to wearer's prescription data as targets.

7. The method of calculating and manufacturing an optical system as claimed in claim 5, wherein "$P_{prox}$" is replaced by "$P_{conf}$" in equation E1 where $P_{conf}$ is the Punctum comfort value expressed in diopter, corresponding to a reduced accommodation effort for the wearer which is compatible with extended use of the system.

8. The method of calculating and manufacturing an optical system as claimed in claim 4, wherein "$P_{prox}$" is replaced by "$P_{conf}$" in equation E1 where $P_{conf}$ is the Punctum comfort value expressed in diopter, corresponding to a reduced accommodation effort for the wearer which is compatible with extended use of the system.

9. The method of calculating and manufacturing an optical system as claimed in claim 8, wherein the method comprises further steps of:
providing a set of data and/or equations defining the exit surface ($ES(R,\alpha,\beta)$) and the opposite surface ($OPS(R,\alpha,\beta)$) of the light guide optical element according to ($R,\alpha,\beta$) coordinates, where R is the distance of a point when considering the Center of Rotation of the Eye as the originate;
providing the refractive indexes between the different surfaces within the list consisting of the back surface, the front surface of the progressive addition ophthalmic lens, the exit surface, the opposite surface of the light guide optical element; and
optimizing simultaneously the average sphere value $D_{BS}(\alpha,\beta)$ over the back surface and the front surface according to the optical target, to the requirements of equation E1 and to wearer's prescription data as targets.

10. The method of calculating and manufacturing an optical system as claimed in claim 4, wherein the method comprises a further step, when $D_{FS}(\alpha,\beta)$ values obtained within the contour $AC(\alpha,\beta)$ corresponds to a sphero-toric surface, of using this sphero-toric surface over the front surface when ($\alpha,\beta$) is out of the contour $AC(\alpha,\beta)$, then optimizing the back surface according to a chosen design data as a target.

11. The method of calculating and manufacturing an optical system as claimed in claim 10, wherein the method further comprises:
providing a set of data and/or equations defining the exit surface ($ES(R,\alpha,\beta)$) and the opposite surface ($OPS(R,\alpha,\beta)$) of the light guide optical element according to ($R,\alpha,\beta$) coordinates, where R is the distance of a point when considering the Eye Center of Reference as the originate;
providing the refractive indexes between the different surfaces within the list consisting of the back surface, the front surface of the progressive addition ophthalmic lens, the exit surface, the opposite surface of the light guide optical element;
providing a desired direction for the supplementary image delivered by the light-guide optical element; and
optimizing the back surface according to the requirements of the wearer's prescription data and the desired direction for the supplementary image as targets.

12. The method of calculating and manufacturing an optical system as claimed in claim 4, wherein the method comprises a further step of selecting a front surface within a plurality of front surface base-curves where the chosen front surface base-curve is the one which approaches the requirements of equation (E1), when ($\alpha,\beta$) is within the contour $AC(\alpha,\beta)$.

13. The method of calculating and manufacturing an optical system as claimed in claim 12, wherein the method comprises further steps of:
providing a set of data and/or equations defining the exit surface ($ES(R,\alpha,\beta)$) and the opposite surface ($OPS(R,\alpha,\beta)$) of the light guide optical element according to ($R,\alpha,\beta$) coordinates, where R is the distance of a point when considering the Eye Center of Reference as the originate;
providing the refractive indexes between the different surfaces within the list consisting of the back surface, the front surface of the progressive addition ophthalmic lens, the exit surface, the opposite surface of the light guide optical element;
providing a desired direction for the supplementary image delivered by the light-guide optical element; and
optimizing the back surface according to the requirements of the wearer's prescription data and the desired direction for the supplementary image as targets.

14. The method of calculating and manufacturing an optical system as claimed in claim 4, wherein the method further comprises:
providing a set of data and/or equations defining the exit surface ($ES(R,\alpha,\beta)$) and the opposite surface ($OPS(R,\alpha,\beta)$) of the light guide optical element according to ($R,\alpha,\beta$) coordinates, where R is the distance of a point when considering the Center of Rotation of the Eye as the originate;
providing the refractive indexes between the different surfaces within the list consisting of the back surface, the front surface of the progressive addition ophthalmic lens, the exit surface, the opposite surface of the light guide optical element; and
optimizing simultaneously the average sphere value $D_{BS}(\alpha,\beta)$ over the back surface and the front surface according to the optical target, to the requirements of equation E1 and to wearer's prescription data as targets.

15. A progressive addition ophthalmic lens having a power variation observed thereon of at least 0.5 Diopter, the progressive addition ophthalmic lens being capable of correcting wearer's vision and having a back surface and a front surface, arranged to deliver a corrected ophthalmic vision image to the wearer through the back A surface, where said back surface is positioned closest to a wearer's eye when the progressive addition ophthalmic lens is worn, the progressive addition ophthalmic lens comprising a light guide optical element arranged to output a supplementary image to the wearer through an exit surface of said light guide optical element, wherein the progressive addition ophthalmic lens is arranged so as to enable the wearer of said lens to provide an accommodation effort that is less than or equal to the wearer's residual accommodative effort when viewing from the corrected ophthalmic vision image to the supplementary image and vice versa,
wherein the progressive addition ophthalmic lens is chosen from within a list consisting of: a lens comprising a far vision zone, an intermediate vision zone and a near vision zone, a lens comprising an intermediate vision zone and a near vision zone, a lens comprising a far vision zone, and an intermediate vision zone.

16. The progressive addition ophthalmic lens as claimed in claim 15, wherein:
the supplementary image is output in at least a zone of the intermediate vision zone and/or of the near vision zone; and
the mean sphere of the front surface is at least 2 Diopter.

17. The progressive addition ophthalmic lens as claimed in claim 15, wherein:
- the progressive addition ophthalmic lens is chosen within the list consisting of a lens comprising a far vision zone, an intermediate vision zone and a near vision zone; and a lens comprising a far vision zone and an intermediate vision zone;
- the supplementary image is output in at least a zone of the far vision zone; and
- the mean sphere of the front surface is equal to or less than 2 Diopter.

* * * * *